2,965,655
PROCESS FOR PREPARING SUBSTITUTED
1-AMINO 2,4-BENZENE-DISULFONAMIDES

Frederick C. Novello, Lansdale, Pa., assignor to Merck & Co., Inc., Rahway, N.J., a corporation of New Jersey No Drawing. Filed Nov. 7, 1957, Ser. No. 694,914

5 Claims. (Cl. 260—397.7)

This invention is concerned with a novel process for the preparation of disulfamylaniline compounds having the general structure

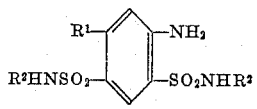

wherein $R^1$ is a halogen, such as chlorine, bromine, or fluorine, a lower alkyl radical advantageously having from 1 to 5 carbon atoms, a lower alkoxy radical also advantageously containing from 1 to 5 carbon atoms in the alkyl portion of the radical, and nitro or amino groups; and $R^2$ is hydrogen or a lower alkyl radical, preferably having from 1 to 5 carbon atoms.

The process of this invention can be illustrated by the series of reactions illustrated below:

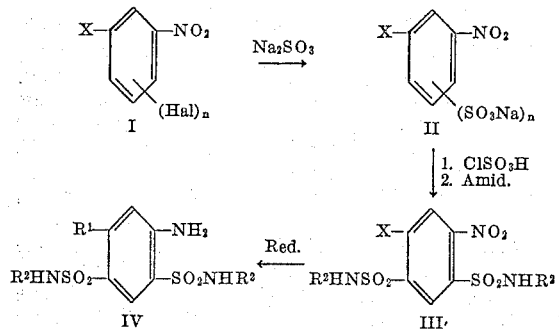

In the above reaction formula, X represents a halogen, such as chlorine, bromine, or fluorine, a lower alkyl radical, a lower alkoxy radical, or a nitro group; $n$ represents the numeral 1 or 2; Hal is halogen, preferably chlorine or bromine, and is attached to one of the carbon atoms in the benzene nucleus in ortho position, para position, and ortho, para positions in relation to the nitro group; and $R^1$ and $R^2$ have the meaning assigned to each of them above.

The novel method illustrated above for preparing the disulfamylaniline compounds comprises converting a mono- or dihalonitrobenzene, I, by treatment with an alkali metal sulfite, to a mono-alkali metal-sulfonate or di-alkali metal-sulfonate of nitrobenzene, compound II. The product thus formed, II, then is converted to the disufonyl chloride by reaction with chlorosulfonic acid and the product thus formed then is amidated thus forming the 2,4-disulfamylnitrobenzene, III. The nitro group of the 2,4-disulfamylnitrobenzene, III, then is reduced to the amino group thus forming the desired 2,4-disulfamylaniline compound, IV.

The novel method of this invention is of particular value because by virtue of preparing an alkali metal sulfonate of the nitrobenzene, I, it is possible to convert these aromatic intermediates to the corresponding disulfonyl chlorides with chlorosulfonic acid without employing sodium chloride in the reaction mixture. This represents a distinct advantage because reaction with chlorosulfonic acid in the presence of sodium chloride results in a slurry which is mechanically difficult to handle in large scale production.

The process of this invention is carried out by reacting the mono- or dihalonitrobenzene with at least two equivalents of an alkali metal sulfite, such as sodium or potassium sulfite. The reactants are advantageously dissolved in water or aqueous alcohol and are heated advantageously under reflux to form the mono-alkali metal-sulfonate or the di-alkali metal-sulfonate of the nitrobenzene, II.

The alkali metal sulfonate of the nitrobenzene, II, then is converted to the disulfonyl chloride by reaction with at least two equivalents of chlorosulfonic acid. While the reaction between the alkali metal sulfonate and chlorosulfonic acid will take place when employing these minimal quantities of reactants to produce the disulfonyl chloride provided the heating is continued for a sufficient length of time, in practice it is preferred to employ an excess of chlorosulfonic acid particularly for its solvent properties. It is, additionally, advantageous to employ an excess of the chlorosulfonic acid in order to cause the reaction to proceed more rapidly to completion. The disulfonyl chloride thus formed then is amidated by reaction with at least four molar equivalents of ammonia or a mono-lower-alkylamine to form the 2,4-disulfamylnitrobenzene, III. Ammonia in substantially any form can be employed in this reaction to form the disulfamyl derivative, such as ammonia in the form of aqueous or alcoholic ammonia or liquid ammonia or by dissolving the disulfonyl chloride in an organic solvent and bubbling ammonia gas into the solution to form the diamide compound. During the initial stage of the reaction, the reaction mixture preferably is cooled in an ice bath and subsequently it is heated, advantageously on the steam bath, to form the corresponding 2,4-disulfamylnitrobenzene, compound III.

The nitro group of the 2,4-disulfamylnitrobenzene, III, is reduced to the amino group either catalytically employing, for example, a platinum catalyst or palladium on charcoal or it can be reduced chemically with, for example, iron in an acidic or an alkaline medium such as by employing iron powder and hydrochloric acid or ferrous sulfate and ammonium hydroxide, or a chemical reduction can be effected with sodium hydrosulfide and the like, thus forming the desired 2,4-disulfamylaniline, compound IV.

The disulfamylaniline compounds prepared by the novel method of this invention are useful pharmacotherapeutic agents principally because of their diuretic, natriuretic, and/or saluretic properties. The disulfamylaniline compounds additionally are useful intermediates for preparing sulfamyl substituted 1,2,4-benzothiadiazine-1,1-dioxide compounds which also possess diuretic, natriuretic, and/or saluretic properties. The disulfamylaniline compounds as well as the benzothiadiazine compounds are effective upon oral administration in the form of tablets or capsules and the like as well as by injection when dissolved in a dilute alkaline medium or in polyethylene glycol. The pharmacotherapeutic properties of the compounds prepared by the novel methods of this invention make them particularly useful in the treatment of congestive heart failure and other abnormalities which produce an edematous condition in the body or which produce an imbalance in the electrolyte concentration in the body, as, for example, those in which an abnormal retention of sodium occurs.

The application of the novel method of this invention to the preparation of disulfamylaniline compounds is illustrated by the following examples.

EXAMPLE 1

5-chloro-2,4-disulfamylaniline

Step A.—A solution of 300 g. of sodium sulfite in 100 ml. of water is added to a solution of 113 g. of 2,4,5-trichloronitrobenzene in 500 ml. of ethanol and heated under reflux for two hours. The solution then is cooled in an ice bath and the solid which precipitates is collected on the filter and dried to give 5-chloronitrobenzene-2,4-disodiumsulfonate.

Step B.—A mixture of 72 g. of 5-chloronitrobenzene-2,4-disodiumsulfonate, obtained as described above, and 250 ml. of chlorosulfonic acid is heated at 125° C. for 3 hours, cooled, and then poured onto 1 kg. of ice. The solid is collected and added portionwise to 200 ml of cold 28% ammonium hydroxide. The mixture is heated on the steam bath for two hours, cooled, and the solid collected on the filter. Recrystallization from aqueous ethanol yields 5-chloro-2,4-disulfamylnitrobenzene.

Step C.—A suspension of 5 g. of the thus obtained 5-chloro-2,4-disulfamylnitrobenzene and 500 mg. of a 5% palladium on charcoal catalyst in 100 ml. of 50% aqueous ethanol is shaken in an atmosphere of hydrogen until three molar equivalents of hydrogen is absorbed. The reaction mixture then is heated to the boiling point and the hot solution filtered and concentrated until 5-chloro-2,4-disulfamylaniline crystallizes. The crystals are separated by filtration and after recrystallization from dilute alcohol the product melts at 251–252° C.

EXAMPLE 2

5-ethoxy-2,4-disulfamylaniline

Step A.—A solution of 316 g. of potassium sulfite in 400 ml. of water is added to a solution of 91.5 g. of 2-chloro-5-ethoxynitrobenzene in 500 ml. of ethanol and heated under reflux for 1½ hours. The solution is cooled in an ice bath and the precipitate which forms is collected on the filter and dried yielding 5-ethoxynitrobenzene-2-potassiumsulfonate.

Step B.—By replacing the 5-chloronitrobenzene-2,4-disodiumsulfonate employed in Example 1, Step B, by an equimolecular quantity of 5-ethoxynitrobenzene-2-potassiumsulfonate and following substantially the same procedure described in Example 1, Step B, there is obtained 5-ethoxy-2,4-disulfamylnitrobenzene.

Step C.—A suspension of 0.1 mole of the thus obtained 5-ethoxy-2,4-disulfamylnitrobenzene in a mixture of 50 ml. of 10% sodium hydroxide and 250 ml. of 10% ammonium hydroxide is heated on the steam bath until the sulfamyl compound is dissolved. To this solution there is added a solution of 180 g. of ferrous sulfate in 600 ml. of water and the reaction mixture is heated for an additional two hours on the steam bath and filtered. The filtrate is acidified with hydrochloric acid to precipitate the 5-ethoxy-2,4-disulfamylaniline which is separated by filtration and dried.

EXAMPLE 3

5-methyl-2,4-di-N-methylsulfamylaniline

Step A.—By replacing the 2,4,5-dichloronitrobenzene employed in Example 1, Step A, by an equimolecular quantity of 2,4-dibromo-5-methylnitrobenzene and following substantially the same procedure described in Example 1, Step A, there is obtained 5-methylnitrobenzene-2,4-disodiumsulfonate.

Step B.—A mixture of 68 g. of 5-methylnitrobenzene-2,4-disodiumsulfonate, obtained as described above, and 250 ml. of chlorosulfonic acid is heated at 125° C. for three hours and the cooled and poured onto 1 kg. of ice. The solid which forms is collected and added portionwise to an aqueous solution of 40 g. of methylamine which is cooled in an ice bath. The mixture then is heated on the steam bath for two hours, cooled, and the precipitate which forms is collected on the filter. Recrystallization from aqueous alcohol yields 5-methyl-2,4-di-N-methylsulfamylnitrobenzene.

Step C.—A suspension of 0.1 mole of the thus obtained 5-methyl-2,4-di-N-methylsulfamylnitrobenzene in a mixture of 50 ml. of methanol and 95 ml. of water containing 4 g. of cupric chloride is heated on the steam bath to 70° C. Six additions each consisting of 5 g. of iron powder followed by 20 ml. of hydrochloric acid, are made over a period of 3½ hours. The temperature is maintained throughout this period between 70–80° C. After final addition of iron powder and concentrated hydrochloric acid, the mixture is heated between 80–85° C. for 1½ hours and then cooled to room temperature and filtered. The filtrate is cooled in an ice bath and neutralized with aqueous sodium hydroxide yielding 5-methyl-2,4-di-N-methylsulfamylaniline which is separated by filtration and dried.

EXAMPLE 4

5-chloro-2,4-disulfamylaniline

By replacing the 2,4,5-trichloronitrobenzene employed in Example 1, Step A, by an equimolecular quantity of 3,4-dichloronitrobenzene, and following substantially the same procedures described in Example 1, Steps A through C, there is obtained 5-chloro-2,4-disulfamylaniline, M.P. 251–252° C.

EXAMPLE 5

5-nitro-2,4-disulfamylaniline

Step A.—By replacing the 2,4, 5-trichloronitrobenzene employed in Example 1, Step A, by an equimolecular quantity of 2,4-dichloro-1,5-dinitrobenzene and following substantially the same procedures described in Example 1, Steps A and B, there is obtained 5-nitro-2,4-disulfamylnitrobenzene.

Step B.—The 5-nitro-2,4-disulfamylnitrobenzene obtained as described above (0.1 mole) is dissolved in 500 ml. of ethanol at 60–75° C. by the addition of 80 ml. of 10% aqueous sodium hydroxide. A solution of sodium hydrosulfide (prepared from 55.2 g. of sodium sulfide and 19.3 g. of sodium bicarbonate dissolved in 100 ml. of water at 50° C.) is added over a period of 20 minutes. The mixture then is heated at 70° C. for two hours and then concentrated in vacuo until 300 ml. of alcohol is removed. The residue is cooled in an ice bath and the solid collected on the filter, transferred to a beaker and treated with excess hydrochloric acid. The precipitate which forms is separated by filtration, washed with water and recrystallized from dilute alcohol yielding 5-nitro-2,4-disulfamylaniline, M.P. 260–262° C.

EXAMPLE 6

5-amino-2,4-disulfamylaniline

By replacing the 5-chloro-2,4-disulfamylnitrobenzene employed in Example 1, step C, by an equimolecular quantity of 5-nitro-2,4-disulfamylnitrobenzene, obtained as described in Example 5, and following substantially the same reduction procedure described in Example 1, step C, there is obtained 5-amino-2,4-disulfamylaniline, M.P. 245–246° C. (dec.).

While the above examples illustrate specific conditions for the preparation of disulfamylaniline compounds by the novel method of this invention, it is to be understood that modifications can be made in the reaction conditions described in the examples and in the reactants employed without departing from the scope of this invention as defined by the appended claims.

This application is a continuation-in-part of applications Serial No. 672,126, filed July 16, 1957, now U.S. Patent No. 2,910,473, and Serial No. 672,127, filed July 16, 1957, now U.S. Patent No. 2,910,474.

What is claimed is:

1. A process for preparing disulfamylaniline compounds comprising refluxing a compound having the general structure

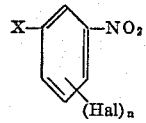

with at least two equivalents of an alkali metal sulfite to form the corresponding alkali metal sulfonate which is heated with at least two equivalents of chlorosulfonic acid to form the disulfonyl chloride derivative which then is amidated by reaction with at least four equivalents of a compound selected from the group consisting of ammonia and a mono-lower-alkylamine thus forming 5-X-2,4-disulfamylnitrobenzene the nitro group of which compound then is reduced in the presence of a substance selected from iron powder in an acidic medium, ferrous sulfate in an alkaline medium, sodium hydrosulfide, a platinum catalyst and a palladium catalyst, yielding a disulfamylaniline having the general structure

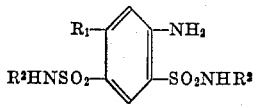

wherein in each of the above structures X is selected from the group consisting of a halogen, a lower alkyl radical, a lower alkoxy radical, and the nitro group; $n$ is an integer selected from 1 and 2; Hal is a halogen selected from the class consisting of chlorine and bromine and is attached to one of the carbons of the benzene nucleus in ortho-position, para-position, and ortho, para-positions in relation to the nitro group; $R^1$ is selected from the group consisting of a halogen, a lower alkyl radical, a lower alkoxy radical, the nitro and the amino group; and $R^2$ is selected from the group consisting of hydrogen and a lower alkyl radical.

2. A process as claimed in claim 1, wherein the 5-X-2,4-disulfamylnitrobenzene is chemically reduced with iron powder in the presence of hydrochloric acid to form the corresponding 5-X-2,4-disulfamylaniline.

3. A process as claimed in claim 1, wherein the amidation is effected by reaction with at least four equivalents of concentrated ammonium hydroxide.

4. A process for preparing 5-chloro-2,4-disulfamylaniline which comprises refluxing 2,4,5-trichloronitrobenzene with at least two equivalents of an alkali metal sulfite to form 5-chloro-nitrobenzene-2,4-disodiumsulfonate which is heated with at least two equivalents of chlorosulfonic acid to form 5-chloro-nitrobenzene-2,4-disulfonyl chloride which then is amidated by reaction with at least four equivalents of ammonia thus forming 5-chloro-2,4-disulfamylnitrobenzene, the nitro group of which then is reduced in the presence of palladium on charcoal to form 5-chloro-2,4-disulfamylaniline.

5. A process for preparing 5-nitro-2,4-disulfamylaniline which comprises refluxing 2,4-dichloro-1,5-dinitrobenzene with at least two equivalents of an alkali metal sulfite to form 1,5-dinitrobenzene-2,4-disodiumsulfonate which is heated with at least two equivalents of chlorosulfonic acid to form 1,5-dinitrobenzene-2,4-disulfonyl chloride which then is amidated by reaction with at least four equivalents of ammonia to form 2,4-disulfamyl-1,5-dinitrobenzene, one nitro group of which then is reduced in the presence of sodium hydrosulfide to yield 5-nitro-2,4-disulfamylaniline.

References Cited in the file of this patent

UNITED STATES PATENTS

| | | |
|---|---|---|
| 2,358,465 | McNally | Sept. 19, 1944 |
| 2,414,403 | Winterbottom | Jan. 14, 1947 |
| 2,464,044 | Kamlet | Mar. 8, 1949 |
| 2,631,167 | Werner | Mar. 10, 1953 |

OTHER REFERENCES

Migrdichian: Organic Synthesis, vol. 2, Reinhold Publishing Corp., New York (1957), pp. 1657–1658, 1672–1673.

Limpricht: Berichte Deutsche Chemische Gesellschaft, vol. 8, p. 289 (1875).

Heinzelmann: Annalen der Chemie, vol. 188, pp. 161–165 (1877).

Northey: The Sulfonamides and Allied Compounds, ASC Monograph Series No. 106, p. 12, Reinhold Publ. Corp. (1948).

Allert: Berichte Deutsche Chemische Gesellschaft, vol. 14, p. 1436 (1881).